INVENTORS.
WILLIAM P. GOLDBERG.
ELLIS HUDES.
WESLEY TANNENBAUM.
BY VITIE J. STAKUN.
Alden D. Redfield
Warren Kunz
ATTORNEYS.

MAGNETIC DRIVE AND BRAKE FOR MAGNETIC TAPE

Filed April 5, 1957

6 Sheets-Sheet 2

INVENTORS.
WILLIAM P. GOLDBERG.
ELLIS HUDES.
WESLEY TANNENBAUM.
VITIE J. STAKUN.

BY Alden D. Redfield
Warren Kunz
ATTORNEYS

MAGNETIC DRIVE AND BRAKE FOR MAGNETIC TAPE

Filed April 5, 1957 6 Sheets-Sheet 3

INVENTORS.
WILLIAM P. GOLDBERG.
ELLIS HUDES.
WESLEY TANNENBAUM.
BY VITIE J. STAKUN.
Alden D. Redfield
Warren Kunz
ATTORNEYS.

INVENTORS.
WILLIAM P. GOLDBERG.
ELLIS HUDES.
WESLEY TANNENBAUM.
VITIE J. STAKUN.
BY Alden D. Redfield
Warren Kunz
ATTORNEYS.

INVENTORS.
WILLIAM P. GOLDBERG.
ELLIS HUDES.
WESLEY TANNENBAUM.
BY VITIE J. STAKUN.
Alden D. Redfield
Warren Kunz
ATTORNEYS.

INVENTORS.
WILLIAM P. GOLDBERG.
ELLIS HUDES.
WESLEY TANNENBAUM.
BY VITIE J. STAKUN.
Alden D. Redfield
Warren Kent
ATTORNEYS.

United States Patent Office 2,953,369

Patented Sept. 20, 1960

2,953,369

MAGNETIC DRIVE AND BRAKE FOR MAGNETIC TAPE

William P. Goldberg, North Woburn, Ellis Hudes, Framingham, Wesley Tannenbaum, Bedford, and Vitie J. Stakun, East Pepperell, Mass., assignors to Avco Manufacturing Corporation, Cincinnati, Ohio, a corporation of Delaware Filed Apr. 5, 1957, Ser. No. 651,080

20 Claims. (Cl. 226—93)

The present invention relates to a magnetic drive and brake for controlling movements of a magnetic tape, particularly a magnetic sound tape such as commonly used today in tape recorder-reproducer apparatus. More specifically, the invention concerns an improved means for rapidly accelerating magnetic tape to high operating speeds and rapidly decelerating it, as required in intermittently operated recorder-reproducer systems.

Presently under investigation is a communication system involving intermittent transmission of recorded information by reflecting radio waves off of the trails of meteor particles which pass through the earth's atmosphere. Since such particles may only be present for short-time periods, it is necessary to confine transmission to such periods and to initiate and terminate transmission instantaneously at the beginning and end of the transmission period. Hence, a drive for a magnetic tape which is capable of starting and stopping a tape almost instantaneously and bringing the tape to a uniform high operating speed is important to avoid loss of information on that part of the tape which passes by the recording head during periods of acceleration and deceleration.

Another important application for the present invention concerns high speed automatic transmission of information from points remote from a receiver. To illustrate, devices are under investigation for recording information, such as temperatures, wind velocities and other weather information, at remote weather stations which are not supervised by human beings. Usually, such weather data are recorded at standard recording speeds over a long time period, such as twenty-four hours. At a predetermined time, the accumulated information is transmitted to a receiver which may be located at some distant center of civilization. Since the accumulated information from several remote transmitters desirably should be received in a short-time period, it will be understood that high speed recorder operation is very desirable. By means of the present invention, it is possible to operate a magnetic tape at high speed, either for transmission or receiving purposes, smoothly, without damage to the tape, and without distortion of the transmitted information. Thus, an accumulated twenty-four hour record of weather information could be transmitted in as short a time as ten minutes through use of the present invention.

The invention not only contemplates the physical arrangement of the means for starting and stopping the tape, but also comprehends the provision of novel electronic circuits for energizing such means. Several circuits have been devised and will be described in detail later in this specification. Briefly stated, however, the means comprises a constantly rotating high-speed capstan over which the magnetic tape is trained. Within the capstan are one or more windings or coils of insulated wire, which may be energized through thyratron control circuits to develop a magnetic flux for attracting the tape into driven engagement with the capstan. In this way, the capstan functions as a magnetic clutch for accelerating the tape to full speed almost instantaneously. When recording, or transmission, as the case may be, is to be terminated, flow of current through the windings of the capstan is cut off simultaneously with the energization of a magnetic brake past which the tape normally moves while it is in motion. Energization of the brake establishes a flux which attracts the tape and arrests its motion.

Current is supplied to the windings of the capstan through spring loaded contacts which ride on slip rings either associated directly with the capstan, or with the shaft which supports and drives the capstan.

From the foregoing, it will be understood that a broad object of the present invention is to provide an improved drive for a magnetic tape and more specifically to provide an improved magnetic drive and associated circuits for quickly accelerating such a tape.

A further object is to provide a magnetic drive comprising a plurality of rotating magnetic windings which can be energized consecutively for accelerating a magnetic tape smoothly and quickly to operating speed.

Another object of the invention is to provide a rotating magnetic drive comprising a plurality of windings at least one of which is continuously energized while the others of which are energized temporarily during the time that the magnetic tape is being accelerated.

Also within the purview of the present invention is the provision of a magnetic brake and associated control circuit for arresting the motion of the tape when the magnetic drive is de-energized.

Other objects of the invention include the following:

(*a*) Provision of a magnetic drive capstan including non-magnetic guide rings for physically guiding the tape;

(*b*) Construction of the capstan to provide continuous pole pieces of limited face width which direct the flux to a well defined portion of the tape;

(*c*) Provision of a control circuit for a plurality of capstan windings adapted to energize the windings consecutively at very short pre-selected time intervals;

(*d*) Provision of control circuits for a drive capstan and magnetic brake which are instantaneously and alternatively energized by a simple sharp control pulse;

(*e*) Provision of a control circuit for multiple capstan windings which phases the energization of the windings to impart uniform acceleration to the tape without repulsion of the tape from the capstan due to mutual inductance effects between the windings.

The novel features that we consider characteristic of our invention are set forth in the appended claims; the invention itself, however, both as to its organization and method of operation, together with additional objects and advantages thereof, will best be understood from the following description of a preferred embodiment when read in conjunction with the accompanying drawings, in which:

Figure 5 is a longitudinal sectional view through a modified embodiment of the magnetic capstan, its associated shaft and slip rings;

*General arrangement*

Figures 1, 4:
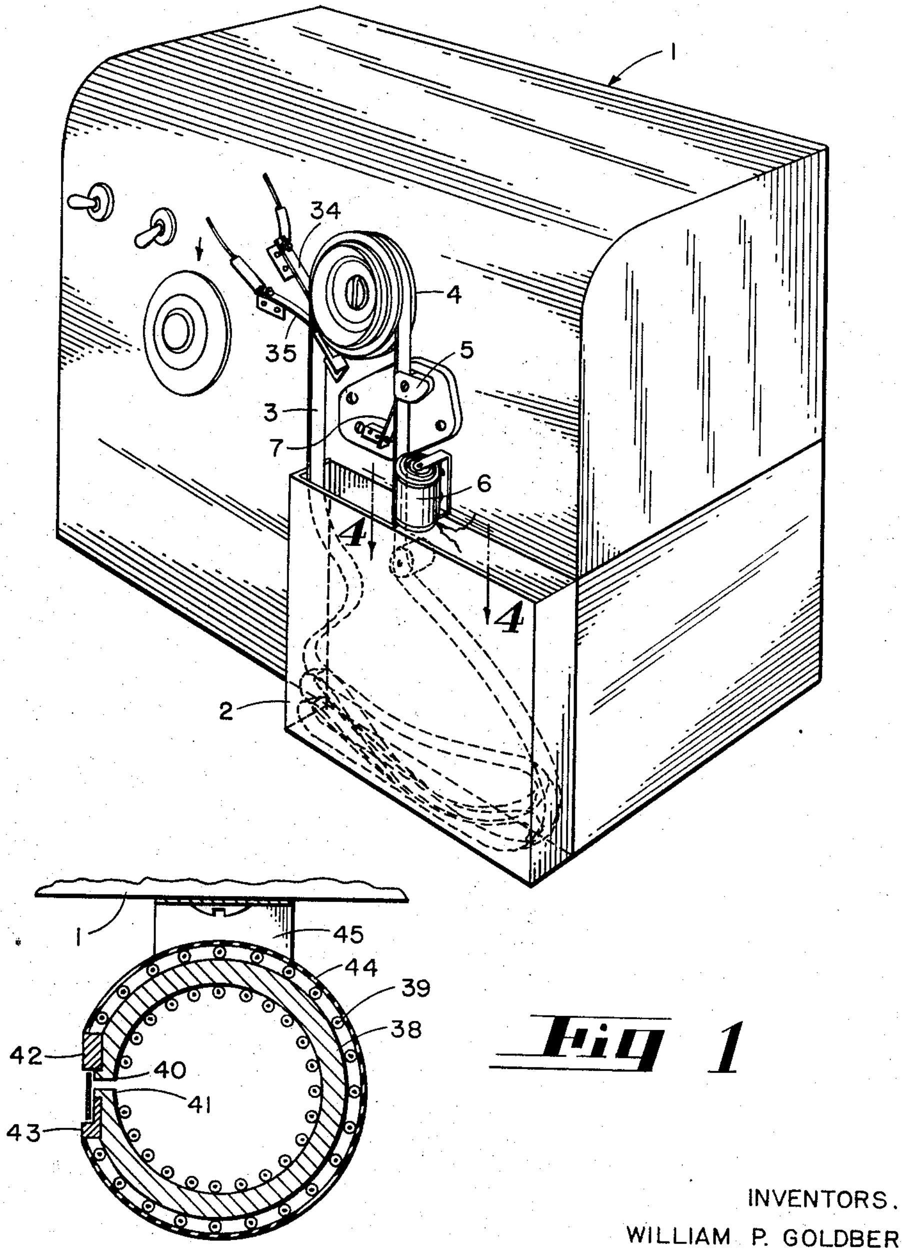
Figure 1 is a perspective view of recorder-reproducer apparatus employing the structure and principles of the present invention.
Figure 4 is an enlarged horizontal sectional view taken on plane 4—4 of Figure 1 showing the internal construction of the magnetic brake.

Attention is first directed to Figure 1 which shows the exterior appearance of a typical tape recorder-reproducer with which the present inveniton finds utility. It will be understood that the figure is merely illustrative and in itself does not constitute a limitation of the invention.

Shown in Figure 1 is a housing, generally designated 1, to the front of which is secured a container or bin 2 within which a magnetic tape 3 may be temporarily stored. The tape is trained over a constantly rotating magnetic capstan 4 including windings, to be described shortly, for establishing a magnetic flux for attracting the tape into driven engagement with the capstan. The tape, when thus set in motion, is drawn past a recorder head or transducer 5 by which the magnetic signal on the tape may be fed to an amplifier, transmitter, or any other electronic device capable of making use of the signal. As will be understood by those skilled in the art, the associated circuit may also be energized to impart a desired signal through the transducer to the tape. Since these portions of the system are conventional and do not relate directly to the present invention, they will not be described in any greater detail. It is sufficient to understand that the magnetic tape is capable of magnetically storing a signal which can be received from or transferred to transducer 5 and an associated circuit.

Also shown in Figure 1 is a magnetic brake 6 which may be energized to arrest the motion of the tape at the instant that the capstan is deenergized.

*Details of magnetic capstan*

Figure 2:
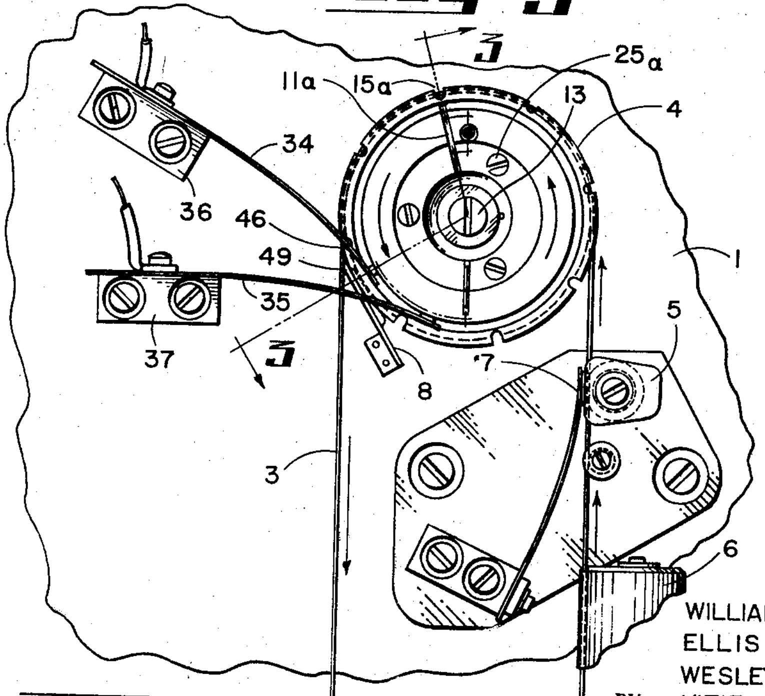
Figure 2 is an enlarged elevational view of that portion of Figure 1 including the magnetic capstan.

Attention is now directed to Figure 2 which shows an enlarged view of magnetic capstan 4 driving tape 3 which is positioned adjacent transducer 5. To assure undistorted transfer of the signal between tape and transducer, a spring loaded pressure pad 7 is provided to hold the tape lightly against the face of the transducer. A stripper 8 is also provided adjacent the discharge side of the magnetic capstan to guarantee complete disengagement of the tape from the capstan. The stripper will be described more fully later in the specification.

Figure 3:
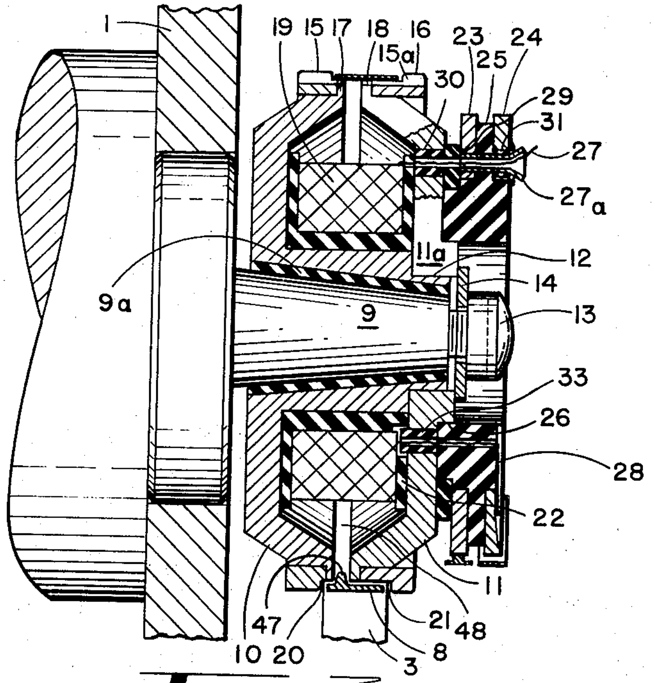
Figure 3 shows to an enlarged scale a vertical sectional view of the magnetic capstan, taken on plane 3—3 of Figure 2.

The internal construction of capstan 4 can be understood from a study of Figure 3. It will be observed that the capstan has a tight taper fit on shaft 9 which rotates at constant speed. The capstan itself consists of an inner portion 10 which is fitted directly to shaft 9, and an outer portion 11, which is piloted on shoulder 12 of the inner portion. A machine screw 13, threaded into shaft 9, and washer 14 hold the assembled capstan portions to the shaft. A nylon sheath 9*a* may be provided as an insulator between shaft 9 and inner portion 10 to prevent eddy current flow between shaft and capstan.

Shrunk tightly on the outer periphery of the capstan portions are non-magnetic guide rings 15 and 16 adjacent circular pole portions 17 and 18. The guide rings may be made from brass or any other non-magnetic material but preferably are made from a non-metal, such as phenolic resin. Steps 20 and 21 on the guide rings confine and guide the magnetic tape. A plurality of transverse grooves 15*a* may be provided at intervals around the periphery of the capstan to permit air to escape as the tape makes surface contact with the capstan.

Attention may now be directed to plastic bobbin 72 about which winding 19 is wound. In the version of the invention illustrated in Figure 3, the winding is continuous and may consist of 600 turns of No. 34 nylon coated copper wire.

Slip rings 23 and 24, through which the winding is energized, are supported by a ring 25 of insulating material. The ring 25 is closely fitted on shoulder 26 and is secured to the capstan portion by screws 25*a*.

Ends 27 and 28 of the winding 19 are electrically connected to slip rings 23 and 24, respectively. As illustrated in Figure 3, end 27 is soldered to flared rivet 27*a*, which may be connected to slip ring 23 at 29 by silver soldering. End 27 is insulated from capstan portion 11 by insulated bushing 30 and rivet 27*a* is insulated from slip ring 24 by bushing 31. Directing attention to end 28 of the winding, it will be noted that it is insulated from capstan portion 11 by bushing 33. Thus, in brief, the slip rings are electrically connected to the ends of winding 29.

The magnetic capstan is energized by a D.C. potential applied to the slip rings 23 and 24 by means of associated spring fingers 34 and 35. These fingers are supported by insulated posts 36 and 37, which may be rigidly attached to the face of housing 1.

To minimize eddy currents, a radial cut 11*a*, or several such cuts, may be made in outer capstan portion 11.

*Details of magnetic brake*

The structural details of the magnetic brake are illustrated in Figure 4. The body of the brake comprises a split cylinder 38 of magnetic material surrounded by winding 39 which, when energized, develops a strong flux between poles 40 and 41. Adjacent these poles are non-magnetic guide tracks 42 and 43, respectively, which position the tape closely adjacent the brake at all times. Suitable insulation 44 may, of course, be provided over the winding. Bracket 45 supports the brake on the face of housing 1.

*General operation*

From the foregoing description of the invention, it will be appreciated that a magnetic tape is trained over the magnetic capstan 4 at all times and that the capstan is constantly rotating. During periods when the tape remains at rest, it is held magnetically against the brake and the winding of the capstan is de-energized. When it is necessary to use the tape for recording or reproduction purposes, the brake is de-energized and the capstan is simultaneously energized through spring fingers 34 and 35 and slip rings 23 and 24. At the instant of energization, winding 19 establishes a flux across pole portions 17 and 18 and through the intervening portion of tape 3. In this way the tape is attracted into driven engagement with the periphery of the capstan between, and partially in contact with, the guide rings 15 and 16. Since the tape itself has very little mass, and the magnetic field can be established almost instantaneously, it will be recognized that the tape can be accelerated to full operating speed almost instantaneously. In fact, using standard 1/4" plastic recorder tape, it has been possible to accelerate the tape from a standstill to 120 inches per second in less than 1 millisecond and experiments to date indicate that through use of the present invention it should be possible to accelerate the tape to speed in as little as 20 microseconds.

Further, the tape follows the magnetic capstan faithfully with the result that the tape can be driven at speeds up to 1000 inches per second. In view of the use intended for the present invention, it will be understood that the high acceleration and operating speeds are very desirable and assure little or no loss of recorded information because of time which elapses during acceleration and deceleration. To illustrate, at low acceleration several inches of tape would pass the transducer before full operating speed was attained. Any information stored on this portion of the tape would not be transmitted faithfully, and would be lost for practical purposes. In contrast, by using the present invention, with practically instantaneous starting and stopping of the tape, there is substantially no loss of stored information, and substantially continuous transmission is possible when the device is used in a meteor communication system.

As indicated earlier, the capstan establishes magnetic flux through that portion of the tape which spans pole portions 17 and 18. Close inspection of Figure 3 will indicate that only one-half of the width of the tape is encompassed by the pole pieces and that the remaining half of the tape is in surface contact with guide ring 16. It is this half of the tape on which the recorded information is stored. Since this portion, which for convenience may be termed the "audio portion," is backed by guide ring 16 and is relatively remote from pole portion 18, no flux from the capstan affects it and hence the information stored on the audio portion is not disturbed in any fashion. By reference to Figure 4, showing the brake, it will again be noticed that the poles 40 and 41 are confined to that half of the tape which is affected by the magnetic capstan, and the "audio portion" remains unaffected by the brake.

Thus, one-half of the tape is devoted to driving purposes and the other half to recording of information.

Since driving of the tape is accomplished by a flux path through the tape itself, and results in attraction of the tape to the periphery of the capstan, there may be some tendency for the tape to stay with the capstan past the discharge point, which for convenience is indicated at 46 in Figure 2. Should this condition occur, the tape quickly winds around the capstan and becomes snarled. To prevent this from happening, the smaller stripper 8, which may be made of brass or other non-magnetic material, is positioned adjacent the discharge point to separate the tape from the capstan. The cross sectional shape of the stripper is shown in Figure 3. It will be noted that projection 47 of the stripper is positioned in the air gap 48 between the portions of the capstan. In this way, there is assurance that edge 49 of the stripper will engage the tape and prevent it from following around the rotating capstan.

As illustrated in Figure 1, tape 3 is endless and is removed from bin 2 as fast as it enters. If desired, conventional reel type equipment may be used provided that rapid acceleration of the reels is avoided through suitable control means.

*Details of two-winding modification of capstan*

Figure 5 shows a modified arrangement of capstan and slip rings involving use of two separate windings 51 and 52 on the capstan. When fully energized, the windings attract the tape in generally the same fashion as already described and quickly accelerate it, bringing it to full speed within a few microseconds.

Shaft 53 supports capstan 54 (which incorporates windings 51 and 52) and, at the end remote from the capstan, slip ring assembly 55. For purposes of illustration, the slip ring assembly is shown as comprising a plastic hub 56 in which a plurality of slip rings 57, 58 and 59 are integrally molded. Each of the slip rings is electrically connected through wires 60 with the windings 51 and 52. Where possible, one end on each winding is joined to a common wire associated with one of the slip rings, such as 58, while the other slip rings 57 and 59 are connected to the remaining ends of windings 51 and 52. In this modification of the invention, a plurality of fingers 61 contact the slip rings.

It will be noted that the shaft 53 is hollow to accommodate wires 60 inter-connecting the slip rings and magnetic capstan; wires 60, of course, are fully insulated from each other and from the shaft.

For purposes of illustration, gear teeth 62 are shown as formed integrally with the shaft 53. A spur gear, indicated by phantom lines at 63, is in driving engagement with gear teeth 62 for imparting constant speed rotation to the shaft. No power source is shown, but it will be readily appreciated that an electric motor or other driving means can be used for driving the shaft and its related assemblies.

*Details of electronic control systems*

Figure 6:
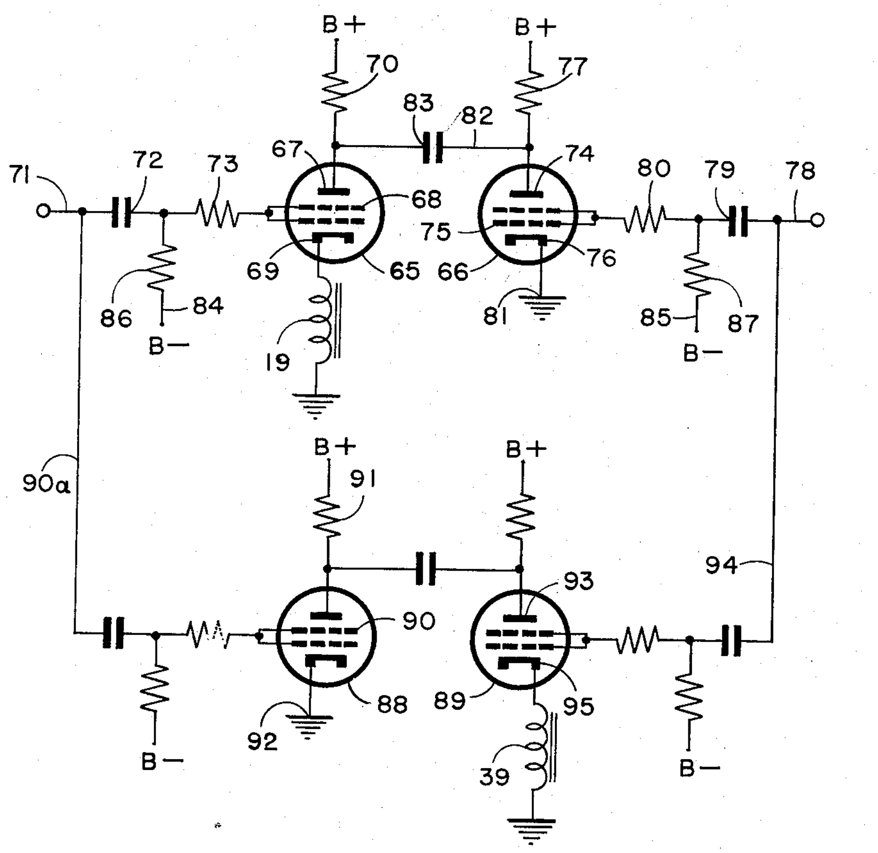
Figure 6 is a schematic of a simplified circuit for energizing the magnetic capstan shown in Figures 1 and 3.
Figure 7:
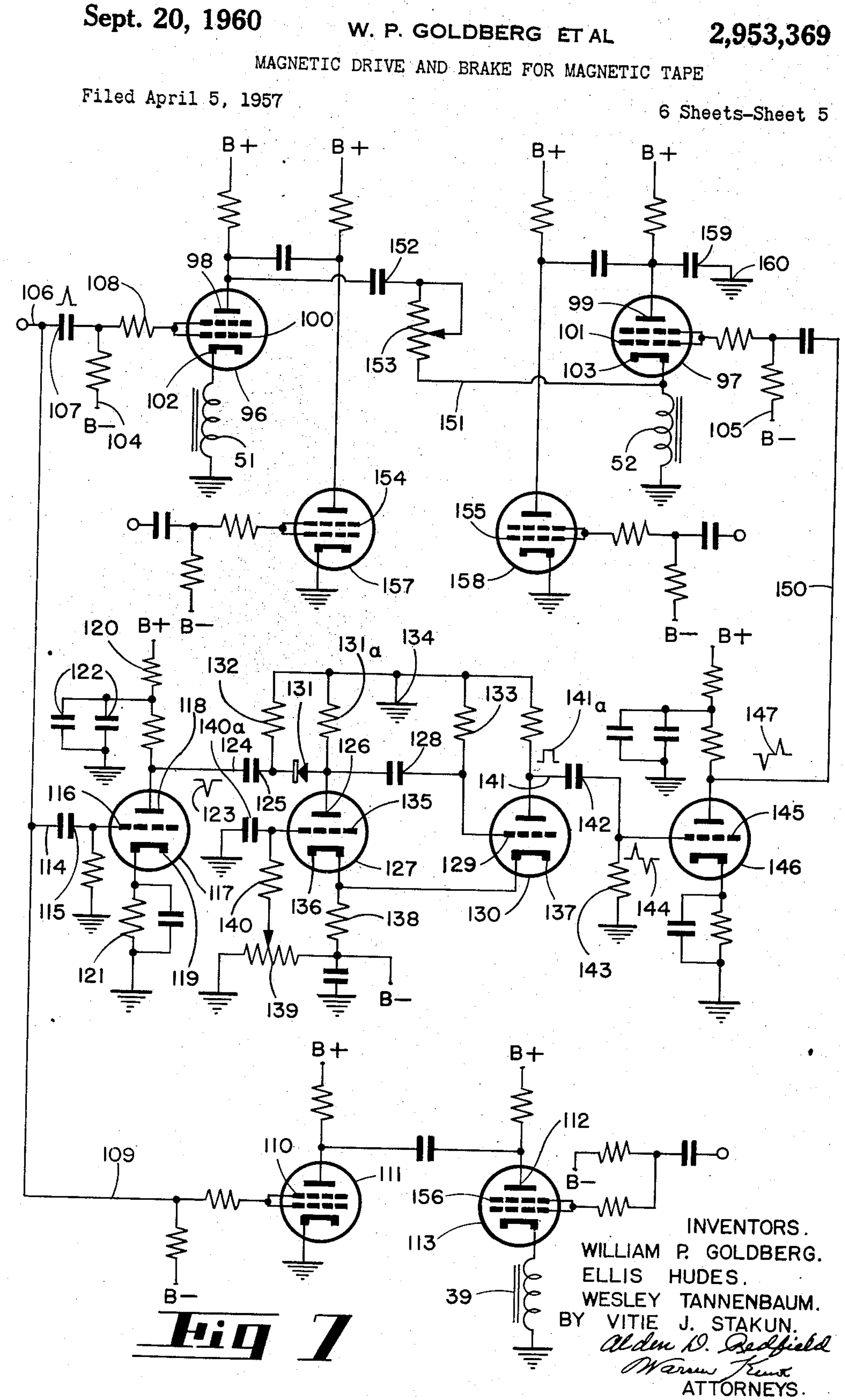

Shown in Figure 6 is a simplified circuit for energizing and de-energizing the magnetic capstan and brake illustrated in Figures 1 through 3. It will be recalled that the magnetic capstan, shown in those figures, employs a single winding 19 which, when energized, attracts the tape into engagement with the capstan. The response time for accelerating the tape to full speed is a function of the amplitude and rise time of the current through the winding of the capstan. In order to minimize the rise time and make possible a relatively large current flow through the winding, a thyratron is used as a control switch, as will now be described.

Directing attention first to Figure 6, thyratrons 65 and 66 control flow of current through winding 19 of the capstan. Thyratron 65 includes plate 67, grid 68 and cathode 69. The plate is connected to a B+ power supply through plate load resistor 70.

An incoming signal is fed to the grid 68 through conductor 71, blocking condenser 72, and resistor 73. If a signal of sufficient amplitude and time duration is impressed on the grid, flow of current from plate to cathode is established almost instantaneously resulting in energization of coil 19 and attraction of the magnetic tape into driven engagement with the capstan.

The thyratron is designed to maintain current flow after it is once triggered. Hence, once the system is energized by a single input pulse, it will operate continuously until flow of current through the thyratron is terminated by some other agency. This may be done through use of thyratron 66 including plate 74, grid 75 and cathode 76. In this instance, the plate is connected to the B+ supply through a relatively large resistor 77. To terminate capstan energization, a control pulse is fed to grid 75 through conductor 78, conductor 79 and resistor 80. When a pulse of sufficient amplitude and time duration is impressed on the grid, flow of current is established from plate 74 to cathode 76 and thence to ground 81. The sudden flow of current through the large resistor 77 drops the voltage of plate 74 and, because of interconnection 82 and condenser 83, simultaneously drops the voltage of plate 67 below cut-off, terminating flow of current through thyratron 65 and coil 19 practically instantaneously. The thyratron 66 de-ionizes itself through the current starvation principle. This is aided by the negative bias 84 and 85 impressed on the grid circuits of thyratrons 65 and 66 through resistors 86 and 87, respectively.

At the lower part of Figure 6 is shown the control circuit for the magnetic brake. Here, thyratrons 88 and 89 are provided for controlling flow of current through winding 39 of the brake. A similarity will be noted between the capstan control and brake control circuits. In the brake control system, however, the current flow through the brake winding is terminated by a control signal impressed on grid 90, which establishes a flow of current through the relatively large plate load resistor 91 to ground 92. In a manner similar to that described before, the voltage is suddenly dropped on plate 93 of thyratron 89, thereby terminating flow of current through winding 39. The occurs simultaneously with the energization of winding 19 of the magnetic capstan. In other words, the capstan and brake windings are energized alternately, current flow through the brake being terminated when flow is established through the capstan and vice versa.

The "stop" signal supplied to conductor 78 to de-energize the capstan is impressed simultaneously on conductor 94 connected to the grid of thyratron 89. The signal establishes flow of current from plate 93 to cathode 95 and through brake winding 39 to energize the brake simultaneously and practically instantaneously with the de-energization of the winding 19 of the capstan.

Attention should now be directed to the form of signal which is capable of operating each of the various thyratrons. Desirably the signal has a sharp positive amplitude of approximately 30 volts and a time duration of approximately one microsecond. This wave form, when impressed upon the grid circuits of any of the tubes, will initiate current flow through the tubes in a manner already described. It only remains to be pointed out that the control signals may be derived from any suitable source such as a radio receiver and amplifier, which have not been described, since they do not constitute a part of this invention. It will also be recognized that the input signal which initiates movement of the tape is impressed simultaneously on conductors 71 and 90*a*, thereby energizing the capstan and de-energizing the brake simultaneously. When movement of the tape is to be stopped, the control signal is impressed simultaneously on conductors 78 and 94, simultaneously de-energizing the capstan and energizing the brake.

The circuit of Figure 6 is entirely satisfactory for many operating conditions. It was found, however, from actual experiments that sudden passage of large currents through winding 19 would result in self induction and current surge within the winding, such that at high tape acceleration, the tape would momentarily depart from, or be repulsed from the surface of the capstan just after the tape started to move. This, obviously, is undesirable. For high rates of acceleration, therefore, attention was directed to a capstan having two windings, such as shown in Figure 5, which could be separately energized. It was found that in this way, the tape could be uniformly and rapidly accelerated to a high operating speed, using the control circuit of Figure 7.

Figure 7:
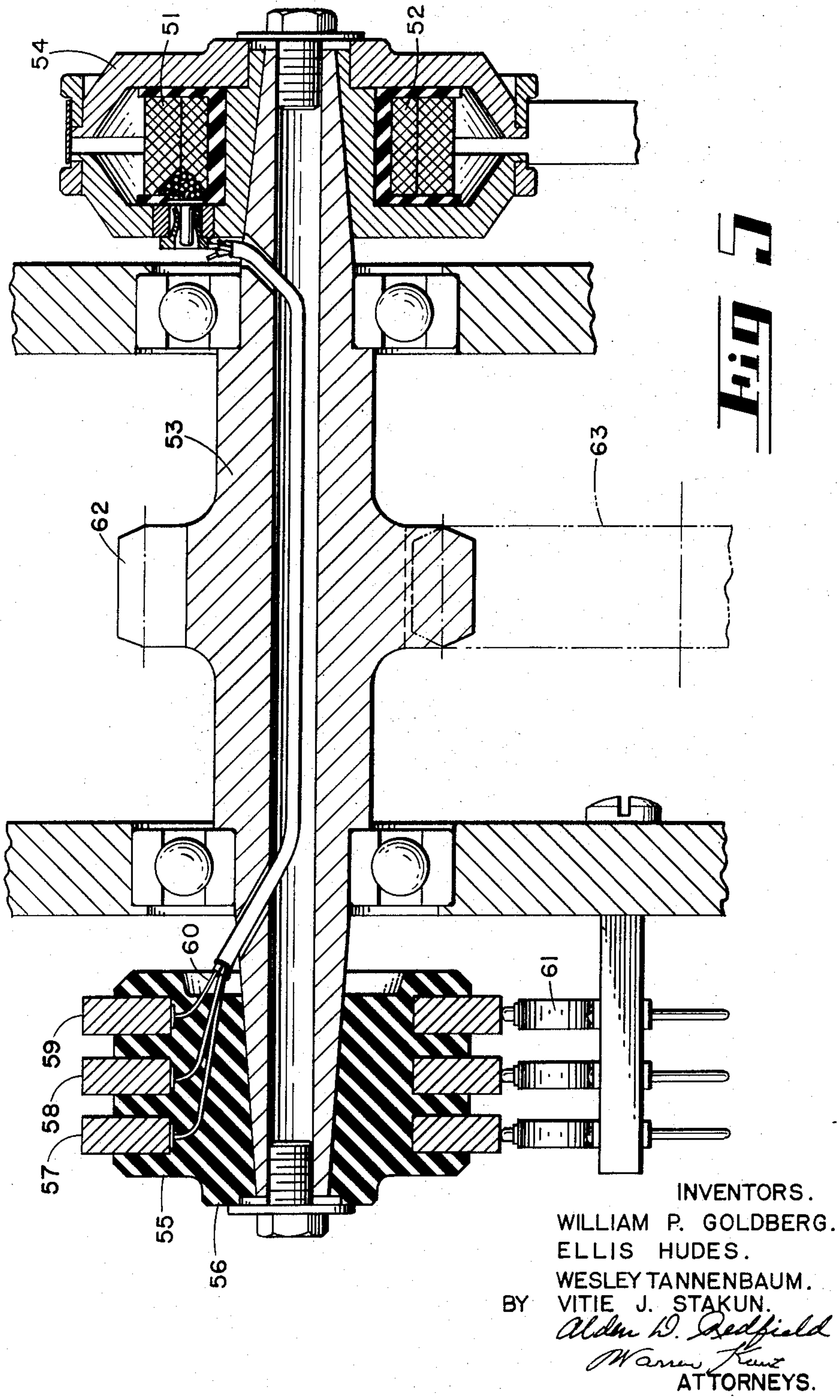
Figure 7 is a schematic of a modified control circuit for a magnetic capstan having two windings which are energized sequentially at pre-determined time intervals.

It will be recalled that the capstan of Figure 5 includes a pair of windings 51 and 52 which are energized consecutively but de-energized simultaneously. As illustrated in Figure 7, thyratrons 96 and 97 are connected in circuit with windings 51 and 52, respectively. These thyratrons include plates 98—99, grids 100—101 and cathodes 102—103 in conventional fashion. A B+ power supply is connected to the plate of each thyratron tube and a B— bias is impressed on the grid of each tube, as indicated at 104 and 105.

Assuming that both capstan windings are initially de-energized, and the winding of the brake is energized, an input signal can be supplied to conductor 106 which is fed through condenser 107 and resistor 108 to the grid 100 of thyratron 96. This establishes a continuous flow of current through winding 51 of the capstan in a manner similar to that described with reference to Figure 6. Simultaneously, the same input signal is impressed on conductor 109 connected to grid 110 of thyratron 111. Operating on the current starvation principle previously described, firing of thyratron 111 drops the voltage of plate 112 of thyratron 113 and in that way cuts off flow of current through the associated brake winding 39. Thus, as soon as winding 51 of the capstan is energized, the brake winding is de-energized.

Energization of the second capstan winding 52 will now be considered. The input signal which triggers thyratron 96 is supplied through conductor 114 and blocking condenser 115 to grid 116 to triode 117. The triode includes plate 118 and cathode 119, the plate being connected to the B+ supply through load resistor 120, and the cathode being connected to ground through resistor 121. Filter condensers may be provided at 122 in the plate circuit. The triode 117 inverts the positive input signal into a negative signal, as suggested at 123, adjacent conductor 124 which is connected through condenser 125 to plate 126 of triode 127, and through condenser 128 to grid 129 of triode 130. These triodes and their associated circuit elements constitute a cathode-coupled, one-shot multivibrator in which triode 130 is initially conducting current heavily, while triode 127 is near cut off. The incoming signal passes through crystal diode 131 which is associated with diode input resistor 132. It will be noted that resistors 131*a* and 132, as well as resistor 133 connected to grid 129, are grounded at 134. To complete the description of the circuit elements, attention is called to triode 127 having grid 135 and cathode 136 which is directly connected to the cathode 137 of triode 130. Cathode resistor 138 is connected to the B— supply and the grid 135 is biased negatively relative to ground through potentiometer 139 and resistor 140. Adjustment of the potentiometer will establish the point at which triode 127 will conduct heavily and determines the initial current flow through tube 127 and therefore is of primary importance in establishing the operating cycle of the multivibrator. Condenser 140*a* is provided as an A.C. path to ground to increase the time-cycle stability of the multivibrator.

The negative input signal 123 passes through condenser 128 and depresses the potential of grid 129 to cutoff triode 130. Practically simultaneously and instantaneously, cathode 136 drops toward the B— potential and sets up a sufficient potential difference relative to grid 135 to establish more current flow through triode 127. Current then continues to flow through this tube and triode 130 remains cut off, while the charge on condenser 128 leaks to ground through resistors 131*a* and 133. This gradually causes the grid 129 to rise towards ground potential and establishes a time period at the end of which triode 130 again becomes conducting. The increased current flow, as conductivity is again established, raises the relatively positive bias of cathode 136 relative to grid 135, eventually resulting in substantial cutoff of triode 127.

The net result of the multivibrator action is to produce a positive square wave in conductor 141, as suggested by graphic illustration 141*a*. This square wave is differentiated by condenser 142 and resistor 143, the reactance of the condenser being very much larger than that of the resistor, and results in wave form 144 being supplied to grid 145 of triode 146. The variation of grid bias changes the plate-to-cathode current flow of the triode and results in a wave form 147 which is supplied through conductor 150 to the grid 101 of thyratron 97. It will be recognized that the negative peak of signal 147 does not affect the thyratron, whereas the positive peak arriving approximately 150 microseconds later, being the decay time of condenser 128 and its associated resistors, finally establishes current flow through the thyratron and capstan winding 52.

As flow builds up through coil 51, after triggering of thyratron 96, mutual induction occurs in winding 52 which may cause premature triggering of thyratron 97 or may prevent triggering of the thyratron at the time the signal pulse arrives. To prevent this, the plate 98 of thyratron 96 is connected to cathode 103 of thyratron 97 through conductor 151, blocking condenser 152 and potentiometer 153. Through adjustment of potentiometer 153, the surge of voltage from plate 98 can be made to balance the voltage surge from winding 52, leaving the potential on cathode 103 substantially unchanged.

When it is desirable to de-energize the capstan and energize the brake, a "stop" signal of positive wave form is impressed upon grids 154, 155 and 156 of thyratrons 157, 158 and 113. Through current starvation, flow of current through thyratrons 96 and 97 is cut off and the capstan windings are de-energized. The signal impressed on grid 156 establishes current flow through thyratron 113 and energizes brake winding 39 in a manner already described in connection with Figure 6.

One variation of the circuit is now called to attention. A relatively large condenser 159 may be connected between ground 160 and plate 99 of thyratron 97. Sudden discharge of this condenser, when thyratron 97 is triggered, initiates a large instantaneous flow of current through winding 52 of the capstan. This assures rapid acceleration of the tape to its final operating speed, if it is not already up to speed.

Figure 8:
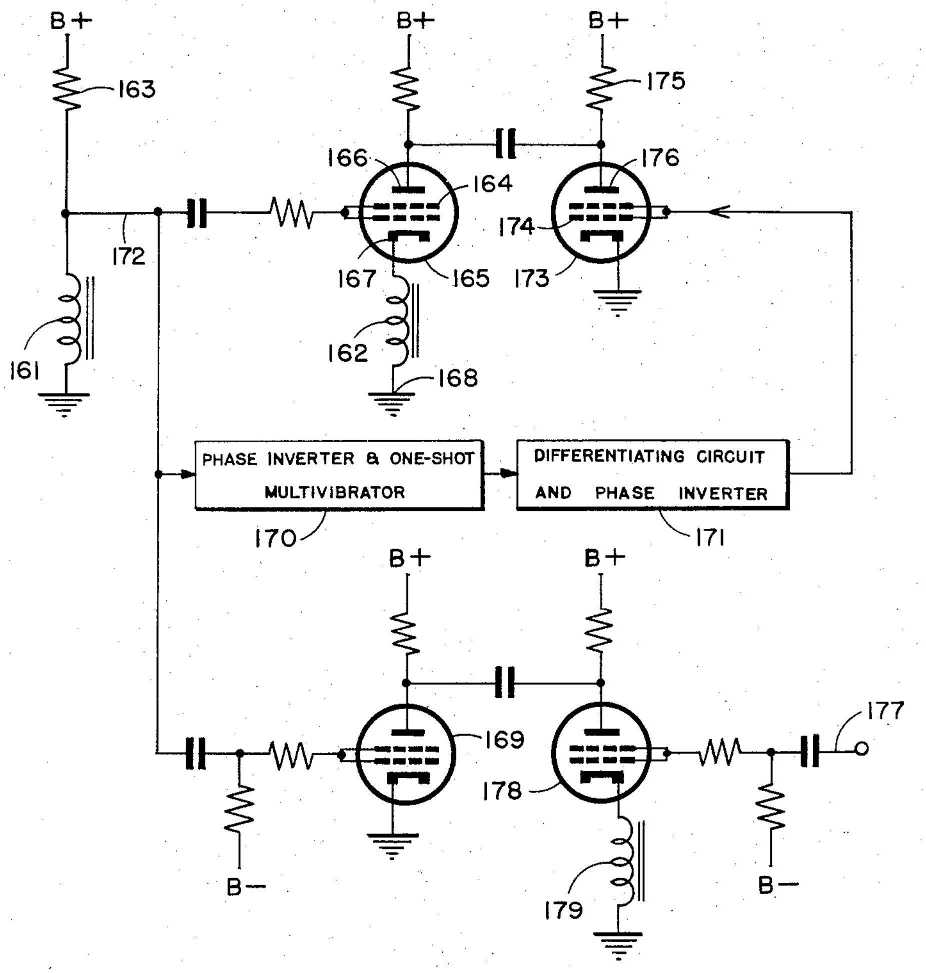
Figure 8 is a schematic of a modified circuit for energizing a magnetic capstan having two windings, one of which is energized continually and the other of which is energized temporarily while the tape is being accelerated.

Another circuit may be employed to energize double windings of a magnetic capstan. This is shown in Figure 8. To avoid confusion with windings 51 and 52 shown in the circuit of Figure 7, the windings are designated 161 and 162 in Figure 8. Winding 161 is constantly energized from the B+ supply through resistor 163. The resulting magnetic flux, however, is not sufficiently large to attract the magnetic tape into driven engagement with the capstan. Instead, the tape remains stationary, engaged by the magnetic capstan just below the threshold of movement. To initiate movement, a "start" signal is impressed on grid 164 of thyratron 165 establishing a flow of current from plate 166 to cathode 167, and thence through winding 162 to ground at 168. Simultaneously, a similar input signal is applied to the grid of thyratron 169 in the brake circuit which de-energizes the brake.

Flow of current through winding 162 is only necessary during the acceleration of the tape. Thereafter, the surface of the tape will travel at the same lineal speed as the surface of the capstan with a co-efficient of static friction which is larger than the co-efficient of dynamic friction previously existing while the tape was stationary.

In order to de-energize the winding 162 after the acceleration period, a phase inverter and one-shot multivibrator 170, and a differentiating circuit and phase inverter 171 may be interconnected between conductor 172 and thyratron 173. Operation of the multivibrator, differentiating circuit and phase inverter, follows conventional principles such as described with reference to Figure 7 and results in a positive control signal at grid 174 at a predetermined time interval after the input signal is impressed upon conductor 172. By providing a large plate load resistor at 175 through which the B+ is connected to plate 176, flow of current through thyratron 173 drops the voltage of plate 166 below cutoff, terminating current flow through thyratron 165 and winding 162.

When it is necessary to stop movement of the magnetic tape, a control signal is merely impressed on conductor 177 which triggers thyratron 178 and establishes a flow of current through the brake winding 179, in a manner discussed heretofore.

The following parameters are recommended for use in the control circuits which have been described:

| | |
|---|---|
| All thyratrons | Type 2D21. |
| Resistor 70 | 500 ohms. |
| Condenser 72 | .01 microfarad. |
| Resistor 73 | 10,000 ohms. |
| Resistor 77 | 560,000 ohms. |
| Condenser 79 | .01 microfarad. |
| Resistor 80 | 10,000 ohms. |
| Condenser 83 | 1.0 microfarad. |
| Resistor 86 | 100,000 ohms. |
| Resistor 87 | 100,000 ohms. |
| Resistor 91 | 500 ohms. |
| Condenser 107 | .01 microfarad. |
| Resistor 108 | 10,000 ohms. |
| Condenser 115 | .01 microfarad. |
| Triode 117 | ½ of 6BK7. |
| Resistor 120 | 12,000 ohms. |
| Resistor 121 | 1,200 ohms. |
| Condensers 122 | .01 microfarad.<br>10 microfarads. |
| Condenser 125 | .01 microfarad. |
| Triode 127 | ½ of 6J6. |
| Condenser 128 | .25 microfarad. |
| Triode 130 | ½ of 6J6. |
| Crystal diode 131 | IN 56. |
| Resistor 132 | 47,000 ohms. |
| Resistor 133 | 1.5 megohms. |
| Resistor 138 | 3,700 ohms. |
| Potentiometer 139 | 100,000 ohms. |
| Condenser 140a | 0.1 microfarad. |
| Resistor 140 | 100,000 ohms. |
| Condenser 142 | .01 microfarad. |
| Resistor 143 | 100,000 ohms. |
| Triode 146 | ½ of 6BK7. |
| Condenser 152 | .1 microfarad. |
| Potentiometer 153 | 50,000 ohms. |
| Condenser 159 | 80 microfarads. |
| Resistor 163 | 200 ohms. |
| Resistor 175 | 560,000 ohms. |

*Summary*

From the foregoing, it will be apparent that by means of this invention, there is provided a magnetic drive and a magnetic brake which can be operated alternately to impart relatively large accelerations and decelerations to a magnetic tape. The tape can be continuously driven at high rates of speed and the overall operation of the system is characterized by very smooth acceleration, deceleration and movement of the tape. If necessary, two windings can be utilized on the capstan to guarantee smooth acceleration.

From the description of control circuits, it will be apparent that numerous variations are possible, all designed to energize the capstan windings and brake windings at the proper times and in the proper manner.

An important aspect of the device is that the tape is not physically damaged in any way, nor is it electrically damaged, as by distortion or by erasure of signals stored on the tape. Further, the invention may be utilized for high speed recording and playback and can be employed in an intermittently operating system without sensible loss of intelligence stored on the tape.

Having described a preferred embodiment of our invention, we claim:

1. In combination in a magnetic tape recorder-reproducer apparatus, a constantly rotating magnetic capstan over which the tape is trained at all times, non-magnetic guide rings on said capstan for guiding the tape, an electrical winding within said capstan, means for conducting electricity to said winding while said capstan is rotating, the tape being magnetically attracted into driven engagement with said capstan when its winding is energized, a magnetic brake adjacent the path of travel of the tape, said brake including poles adjacent the tape and a winding which when energized establishes a flux between said poles for attracting and arresting the tape, and an electrical control circuit for alternately energizing the windings of said capstan and said brake.

2. In combination in a tape recorder-reproducer apparatus a constantly rotating magnetic capstan including a winding which, when energized, establishes a flux within said capstan and attracts the tape into driven engagement with the periphery of said capstan, and an electronic control circuit for energizing and de-energizing said winding and thereby regulating movement of the tape, said circuit comprising a thyratron including a plate and a cathode connected to the winding, a control grid between said plate and cathode biased to establish a continuous flow of current through said thyratron and winding when subjected to a positive control pulse, a second thyratron including a plate, a cathode, and a control grid therebetween, a relatively large load resistor in circuit with said last-mentioned plate, and a conductor including a blocking condenser between the plates of said thyratrons whereby a control pulse impressed on said control grid of said last-named thyratron reduces the plate voltage of said first-named thyratron below cutoff terminating current flow through said winding.

3. In a magnetic tape recorder-reproducer apparatus, a constantly rotating magnetic capstan including a winding for establishing flux within said capstan by which the tape is attracted into driven engagement therewith, a magnetic brake including a winding for establishing flux within said brake for attracting the tape and arresting its motion, and an electronic control circuit for energizing said windings, said circuit comprising a thyratron connected to each of said windings for establishing current flow therethrough when triggered by a control pulse fed to the grid of each thyratron, and thyratron circuits plate-coupled to said first-named thyratrons for interrupting current flow therethrough by current starvation.

4. In a magnetic tape recorder-reproducer apparatus, a rotating magnetic capstan having a pair of windings for establishing flux by which the tape is attracted into driven engagement with said capstan; a thyratron connected to each of said windings for establishing current flow therethrough when triggered by a control signal fed to the grid of each thyratron; means for impressing a signal on the grid of one thyratron; a phase inverter, one-shot multivibrator, differentiator and phase inverter connected in series to receive the signal and produce a second signal after a pre-determined time interval; and means for feeding the last named signal to the grid of said other thyratron for energizing its associated capstan winding at the end of the pre-determined time interval.

5. Apparatus as defined in claim 4 including charge storage means connected to discharge through said other thyratron and its associated capstan winding when the last named signal is fed to the grid of said other thyratron.

6. Apparatus as defined in claim 5 and, in addition, a magnetic brake positioned adjacent the tape at one point in its travel, a winding for said brake for establishing a flux therein to arrest the motion of the tape, and means for energizing said winding of said brake during time periods when said capstan windings are de-energized.

7. In combination in apparatus utilizing magnetic tape, a rotating magnetic capstan having a plurality of electrical windings which may be energized to drive the magnetic tape, a magnetic brake adjacent the tape, said brake having a winding which may be energized to stop the tape, an electronic control circuit for simultaneously de-energizing said brake winding and energizing one of said capstan windings, said circuit including means for energizing the remaining capstan windings sequentially thereafter, said circuit including additional means for simultaneously de-energizing said capstan windings and energizing said brake winding.

8. In combination in a magnetic tape recorder-reproducer apparatus, a rotating magnetic capstan having a pair of electrical windings for establishing flux therein and imparting movement to tape trained over said capstan, means for constantly energizing one of said windings to attract the tape to the capstan just below the threshold of movement, and means for temporarily energizing the other winding to increase the flux sufficiently to impart movement to the tape, energization of said other winding being terminated after the tape has attained full operating speed.

9. Apparatus as defined in claim 8 and, in addition, a magnetic brake adjacent the tape having a winding for establishing flux in said brake for attracting the tape and arresting its motion, and a control circuit connected to said winding for energizing it when said windings of said capstan are de-energized, and only at such time.

10. In combination in a magnetic tape recorder-reproducer apparatus, a constantly rotating shaft, a magnetic capstan secured to said shaft for conjoint rotation therewith, said capstan including non-magnetic guide rings on its periphery for guiding and directing the tape, said capstan also including at least one electrical winding, and means for energizing and de-energizing said winding to control magnetic attraction of the tape into driven engagement with said capstan.

11. In combination in a tape recorder, a magnetic brake closely adjacent the tape at one point of its travel, said brake comprising a generally cylindrical body portion formed to define poles adjacent the path of tape movement, non-magnetic guide pieces secured adjacent said poles to guide the tape, a winding about said body portion, and means for energizing said winding to establish a magnetic flux between said poles for attracting the tape and arresting its motion.

12. A magnetic capstan assembly comprising a pair of spaced disk-shaped portions defining circular spaced poles at their peripheries and defining between them a hollow annulus, a plastic bobbin within said annulus, a winding of wire about said bobbin, an insulating support ring secured to one disk-shaped portion, a plurality of slip rings on said support ring, and insulated electrical connections between said slip rings and said winding whereby potential may be applied to said slip rings for establishing flow of current in said winding and flux across said circular poles.

13. In combination in a tape recorder, a constantly rotating hollow shaft having exposed ends, a magnetic capstan assembly secured to one end and an insulated slip ring assembly secured to the other end thereof, said capstan assembly comprising axially spaced disk-like magnetic portions defining spaced circular poles at their peripheries, non-magnetic guide rings on the peripheries adjacent said poles, and windings between said disk portions; said slip ring assembly comprising an insulated hub and a plurality of axially spaced slip rings supported by said hub; and electrical conductors connected to and extending between said slip rings and said windings, said conductors passing through the hollow interior of such shaft.

14. In combination in a magnetic tape recorder-reproducer apparatus, a rotating capstan including means for establishing a magnetic flux therein, the tape being trained over the periphery of said capstan at all times, a circuit for energizing said means to establish flux within said capstan thereby attracting the tape into driven engagement with the periphery of said capstan, a magnetic brake having means for establishing a flux therein, said brake being positioned adjacent the tape, and a control circuit for energizing said last-named means alternately with said means of said capstan.

15. In combination in a device utilizing magnetic tape, a rotatable magnetic capstan for driving the tape, non-magnetic guide means for guiding the tape, and means for creating flux within said capstan for magnetically attracting the tape into driven engagement with the periphery of said capstan adjacent said guide means, said guide means confining the flux to a specific portion of the tape.

16. Apparatus as defined in claim 15 in which said capstan is radially cut to reduce eddy current circulation.

17. In combination in a device for driving magnetic tape, a rotatable capstan comprising spaced peripheral pole portions, means for establishing magnetic flux between said pole portions, and means for guiding the magnetic tape relative to said pole portions to confine the flux between said pole portions to a discrete region of the magnetic tape.

18. In combination in apparatus utilizing magnetic tape, a rotatable magnetic capstan having a plurality of electrical windings, and an electrical control circuit for energizing said windings sequentially to produce magnetic flux within said capstan for rapidly accelerating the magnetic tape to the peripheral speed of said capstan.

19. In combination in apparatus utilizing magnetic tape, a rotatable shaft, a magnetic capstan secured to said shaft for rotation therewith, an insulating sheath between said shaft and said capstan, and means for establishing flux within said capstan for attracting the tape into driven engagement with its periphery, said capstan being radially cut to reduce eddy current circulation therein.

20. In combination in apparatus utilizing magnetic tape, a rotatable shaft, a magnetic capstan secured to said shaft for rotation therewith, an insulating sheath between said shaft and said capstan, non-magnetic guide rings on the periphery of said capstan for guiding and directing the tape, said guide rings including a plurality of transverse grooves to permit air to escape as the tape makes surface contact with said capstan, and means for establishing flux within said capstan for attracting the tape into driven engagement with its periphery.

References Cited in the file of this patent

UNITED STATES PATENTS

| | | |
|---|---|---|
| 1,937,991 | Stearns | Dec. 5, 1933 |
| 2,433,014 | Rendel | Dec. 23, 1947 |
| 2,831,678 | MacNeill | Apr. 22, 1958 |

UNITED STATES PATENT OFFICE

CERTIFICATE OF CORRECTION

Patent No. 2,953,369 September 20, 1960

William P. Goldberg et al.

It is hereby certified that error appears in the printed specification of the above numbered patent requiring correction and that the said Letters Patent should read as corrected below.

Column 3, line 18, for "inveniton" read -- invention --; column 4, line 3, for "72" read -- 22 --; column 6, line 42, for "conductor", second occurrence, read -- condenser --.

Signed and sealed this 11th day of April 1961.

(SEAL)
Attest:
ERNEST W. SWIDER
Attesting Officer

ARTHUR W. CROCKER
Acting Commissioner of Patents